(12) United States Patent
Fuse

(10) Patent No.: US 6,872,110 B2
(45) Date of Patent: Mar. 29, 2005

(54) WATER JET PROPELLER APPARATUS FOR A PERSONAL WATERCRAFT

(75) Inventor: Tomohiro Fuse, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/668,611

(22) Filed: Sep. 23, 2003

(65) Prior Publication Data

US 2004/0097147 A1 May 20, 2004

(30) Foreign Application Priority Data

Sep. 27, 2002 (JP) ........................................ 2002-284217

(51) Int. Cl.$^7$ .............................................. B63H 23/36
(52) U.S. Cl. ........................................ 440/112; 440/38
(58) Field of Search ............................ 440/38, 111, 112

(56) References Cited

U.S. PATENT DOCUMENTS 4,541,808 A * 9/1985 Ono et al. ..................... 440/42
6,273,768 B1 * 8/2001 Blanchard ..................... 440/38
6,287,162 B1 * 9/2001 Freitag et al. ................. 440/82

* cited by examiner

Primary Examiner—Stephen Avila
(74) Attorney, Agent, or Firm—Carrier, Blackman & Associates, P.C.; William D. Blackman; Joseph P. Carrier

(57) ABSTRACT

A jet pump for a personal watercraft is designed to prevent water from contacting an impeller shaft therein. The apparatus includes a stator 31 with a channel 18 formed therein. An impeller 32 and an impeller shaft 35 are rotatably disposed in the stator 31, and are connected to one another by a threaded connection therebetween. A collar 40 is integrally formed with the impeller 32, and a water-resistant seal 37 is provided between the collar 40 and the stator. The impeller shaft 35 is constructed so that a drive shaft 22 is connectable to the front thereof by a spline fit. A shock-absorbing member 50 is provided for placement between the impeller shaft and the drive shaft, and the shock-absorbing member includes structure adapted to allow air or grease to pass toward the drive shaft side thereof, when the impeller is screwed on to the impeller shaft.

21 Claims, 6 Drawing Sheets

WATER JET PROPELLER APPARATUS FOR A PERSONAL WATERCRAFT

CROSS-REFERENCE TO RELATED APPLICATIONS

The present application claims priority under 35 U.S.C. 119 based on Japanese patent application No. 2002-284-217, filed Sep. 27, 2002.

BACKGROUND OF THE INVENTION

1. Field of the Invention

The present invention relates to a water jet propeller apparatus for a vessel, such as a personal watercraft. More particularly, the present invention relates to a water jet-propeller apparatus in which an impeller and an impeller shaft are joined in a manner such that water intrusion via the impeller shaft is minimized, and a corrosive effect on the impeller shaft is reduced, due to its limited exposure to the water being propelled by the impeller.

2. Description of the Background Art

A small waterboat, or personal watercraft, is a small size craft that is constructed and arranged to glide under power across the surface of a sea or of a lake. Many jet skis and other different types of personal watercraft are known and are commercially available.

In the art relating to personal watercraft, some designs for water jet propellers are known. For example, FIG. 6 hereof is a reproduction of one of the drawings from Japanese utility Model Registration No. 2548210. FIG. 6 is included herein for purposes of discussing one example of a previous design for a water jet propeller.

The known water jet propeller apparatus of FIG. 6 is mounted to the rear portion of a vessel body. The known water jet propeller apparatus of FIG. 6 includes a stator (duct) 1 defining a channel, an impeller 2 rotatably disposed inside the stator channel, and an impeller shaft 3, connected to the back of the impeller 2, and rotatably supported by a bearing unit 1a in the stator 1. The water jet propeller apparatus of FIG. 6 also includes a collar 4, provided on the outer periphery of the impeller shaft 3, and a water-resistant seal 5 provided between the collar 4 and the bearing unit 1a. A drive shaft 6 is connected to the front of the impeller 2, and the impeller 2 is rotated via the drive shaft 6 which, in turn, is driven by an engine (not shown). The vessel body is propelled by ejection of water toward the rear (to the right in the drawing).

In the jet propeller in the reference described above, a front edge 4a of the collar 4 simply and abuts against a rear edge 2a of the impeller 2 in a non-sealed manner. There is a problem with the design of this reference, in that water may leak in through a gap between the front edge 4a of the collar 4 and the rear edge 2a of the impeller 2. After leaking through the aforementioned gap, such water may come into contact with the surface of the impeller shaft 3, thereby undesirably corroding the surface of the impeller shaft 3.

This problem can be minimized by forming the impeller shaft 3 out of a corrosion-inhibiting material (for example, stainless steel). However, cost of this corrosion-inhibiting material can be prohibitive.

Although the known devices have some utility for their intended purposes, a need still exists in the art for an improved water jet propeller apparatus for a personal watercraft. In particular, there is a need for an improved water jet propeller apparatus in which an impeller and an impeller shaft are joined in a manner such that water intrusion via the impeller shaft is minimized.

SUMMARY OF THE INVENTION

The present invention provides a water jet propeller apparatus that reduces the corrosion problems that were experienced in the prior art. A water jet propeller apparatus according to the present invention includes an impeller and an impeller shaft, which are connected in a manner such that water intrusion via the impeller shaft is minimized.

In order to achieve the object described above, a water jet propeller apparatus according a first aspect of the present invention includes a stator defining a channel therein, an impeller rotatably disposed in the stator channel, and an impeller shaft rotatably supported in the stator and operatively attached to the impeller. The a water jet propeller apparatus according the first aspect hereof also includes a collar provided on the impeller shaft, and a water-resistant seal provided between the collar and the stator. According to the first aspect hereof, the collar is integrally formed with the impeller.

A water jet propeller apparatus according to a second aspect hereof has the impeller shaft threadably connected to the back of the impeller via intermeshed threads on the respective parts.

The water jet propeller apparatus hereof may be constructed and arranged in a manner such that a drive shaft is connectable to the front of the impeller by a spline fit.

In a selected illustrative aspect hereof, a shock-absorbing member is provided in the impeller, proximate a front end of the impeller shaft, to receive and cushion a rear tip end of the drive shaft. Where used, the shock-absorbing member may have an outer periphery with at least one fluid passage formed therein, and may be constructed and arranged to allow a fluid to flow therepast, from the impeller shaft side toward the drive shaft side, when the impeller shaft is threadably installed on the impeller.

As noted above, the water jet propeller apparatus according to the first aspect hereof includes the stator defining the channel, the impeller rotatably disposed in the stator, the impeller shaft rotatably supported in the stator and connected to the impeller, the collar provided on the impeller shaft, and the water-resistant seal provided between the collar and the stator, and is characterized by the collar being integrally formed with the impeller.

Therefore, in the water jet propeller apparatus according to the first aspect, no gap exists between the collar and the impeller, and thus water is prevented from leaking between the collar and the impeller toward the impeller shaft. Therefore, the surface of the impeller shaft is substantially prevented from being corroded (at least prevented from being significantly corroded), and consequently, it is not necessarily required to form the impeller shaft of a corrosion-inhibiting material.

Further, since the collar and the impeller are integrally formed, the number of components can be reduced, and connecting rigidity between the impeller shaft and the impeller may be improved.

In the water jet propeller apparatus according to the second aspect hereof, the impeller shaft is threadably connected to the back of the impeller by intermeshing threads on the respective parts, and the drive shaft is connectable to the front of the impeller by spline fit. Therefore, if desired, the impeller shaft and the impeller can be concurrently removed from the drive shaft in a joined state.

In addition, in the embodiment of the present invention with the shock-absorbing member provided in the impeller between the front end of the impeller shaft and the rear end of the drive shaft, the force of an impact exerted when the impeller is attached to the rear end of the drive shaft may be alleviated.

In this arrangement, unless a preventative measure is taken, a fluid, which may be air or grease, and which is situated between the impeller shaft and the shock-absorbing member, could possibly become trapped when fastening the impeller shaft to the back of the impeller, and this trapped fluid could damage or deform the shock-absorbing member.

In order to cope with such a problem, in the water jet propeller apparatus according to a third aspect hereof, the outer periphery of the shock-absorbing member is constructed and arranged so as to allow a fluid to flow therepast, from the impeller shaft side to the drive shaft side, when the impeller shaft is connected to the impeller. Therefore, excessive deformation of the shock-absorbing member is prevented.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIGS. 4(a) and 4(b) are drawings showing a shock-absorbing member 50 according to a first embodiment thereof, in which FIG. 4(a) is a rear plan view of the shock absorbing member taken from a vantage point behind the vessel body, and FIG. 4(b) is a partially cross-sectional side view thereof.

FIGS. 5(a) and 5(b) are drawings showing a modified version of the shock-absorbing member according to a second embodiment thereof, in which FIG. 5(a) is a rear plan view of the shock absorbing member taken from a vantage point behind the vessel body, and FIG. 5(b) is a side view thereof.

DETAILED DESCRIPTION

Figure 1:
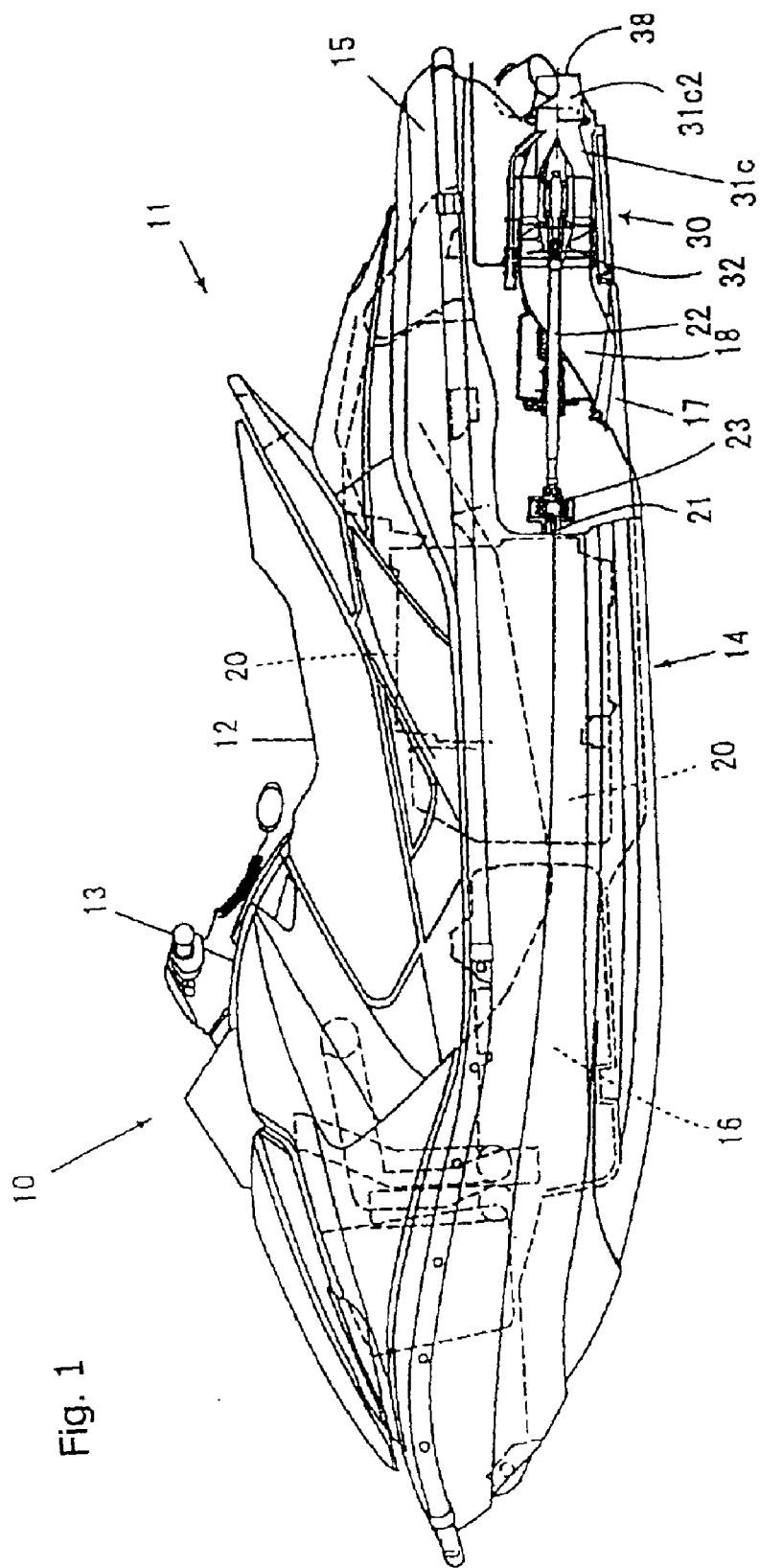
FIG. 1 is a side plan view, partially cut away, showing an example of a small watercraft employing a selected illustrative embodiment of a water jet propeller apparatus according to the present invention.

An illustrative embodiment of a water jet propeller apparatus for a personal watercraft according to the invention is described below, with reference to the accompanying drawings. Herein, expressions of "front", "rear", "left", and "right" denote the directions as viewed from the vantage point of a driver.

Referring now to the drawings, an embodiment of the present invention will be described.

FIG. 1 is a partly cross-sectional schematic side view showing an example of a small planing vessel or personal watercraft employing a selected illustrative embodiment of the water jet propeller apparatus according to the present invention.

As shown in the drawings (mainly in FIG. 1), a small watercraft 10 is a saddle riding type vessel in which a boater is able to sit on a seat 12 of a vessel body 11, and to operate the vessel while gripping a steering handle 13 with a throttle lever.

The vessel body 11 is a floating structure, formed by joining a hull 14 and a deck 15, with an interior space 16 therebetween. In the interior space 16, an engine 20 is mounted on the hull 14, and a water jet propeller apparatus 30 is mounted at the rear of the hull 14 and is driven by the engine 20 to propel the watercraft 10 in the water. (The water jet propeller apparatus 30 will also be referred to herein as a jet pump 30 for reasons of brevity in explanation).

Figure 2:
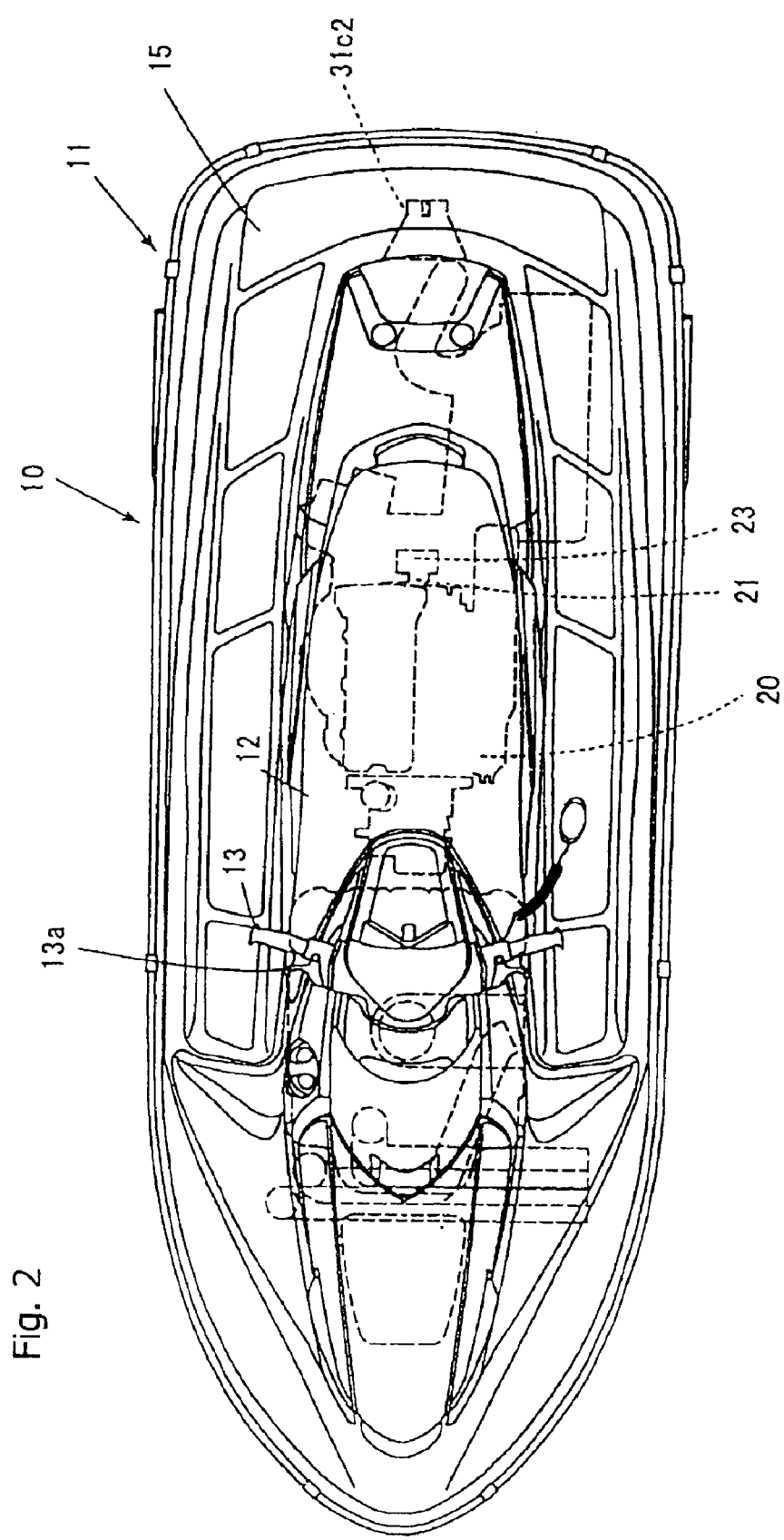
FIG. 2 is a top plan view of the watercraft of FIG. 1.
Figure 3:
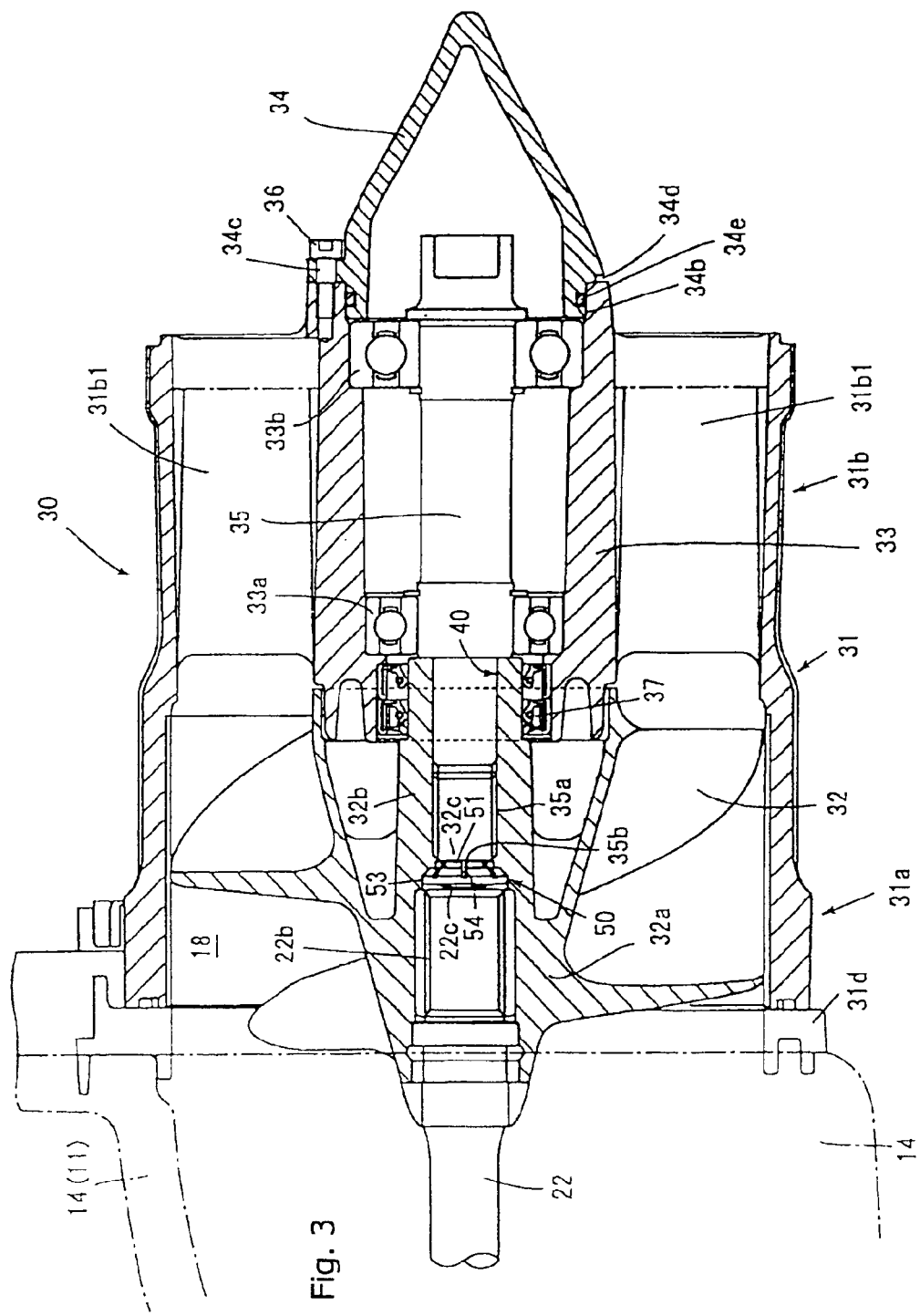
FIG. 3 is a cross-sectional detail view showing a jet pump 30 hereof, according to a first aspect of the present invention.

Referring now to FIGS. 1–3, the jet pump 30 includes a substantially cylindrical stator 31, and an impeller 32 disposed in a channel 18 formed within the stator 31. The channel 18 extends from a water intake opening 17 formed in the bottom of the hull 14 to a nozzle 31c. A drive shaft 22 is connected, via a coupler 23, to an output shaft 21 of the engine 20 for driving the impeller 32.

Upon being discharged from the channel 18, jetted water from the jet pump 30 is directed through a jet flow port 31c2, opening toward the rear end of the vessel body, and to a deflector 38. Therefore, when the impeller 32 is rotated by the engine 20, via the coupler 23 and the shaft 22, water taken from the water intake 17 is ejected from the jet flow port 31c2 through the deflector 38, whereby the vessel body 11 is propelled.

The rotation speed of the engine 20, that is, the propelling power generated by the jet pump 30, is controlled by rotating a throttle lever 13a (See FIG. 2) of the operating handle 13. The deflector 38 is linked to the operating handle 13 via an operating wire, not shown, and rotated by pivoting the operating handle 13 about its vertical axis, whereby the direction of travel of the vessel body 11 can be changed.

Overview of the Jet Pump Structure

As shown in FIG. 3, the jet pump 30 includes the stator (duct) 31 forming the channel 18 in cooperation with the water intake 17 (See FIG. 1) provided on the bottom of the vessel body 11. The impeller 32 is disposed in the stator 31, along with a bearing unit 33 for the impeller also disposed in the stator 31. A cap 34 is also provided for closing a rear end of the bearing unit 33. The jet pump 30 is detachably attached to the hull 14 by fixing a flange 31d formed at the front portion of the stator 31 to the hull 14 with a bolt, not shown.

The Stator

The stator 31 includes an impeller storage section 31a, a bearing storage section 31b, and a nozzle section 31c (See FIG. 1). The impeller storage section 31a and the bearing storage section 31b are integrally formed as sub-parts of the impeller 31. The bearing unit 33 is integrally formed in the bearing storage section 31b via a stationary vane 31b1.

Spline Connection

The front portion of the impeller 32 includes an impeller boss 32a, which is formed with a female spline configuration to receive and engage a spline shaft 22b, formed at the rear tip end of the drive shaft 22, so the impeller will rotate concurrently with the drive shaft 22. The front extremity of the drive shaft 22 is connected to the output shaft 21 of the engine 20 via the coupler 23 (FIG. 1) as described above.

Impeller Shaft

An impeller shaft 35 extends in back of the impeller 32 for connecting to a rear portion 32b of the impeller boss 32a. The impeller shaft 35 is rotatably supported by ball bearings 33a, 33b, for rotation about its longitudinal axis.

The impeller shaft 35 is formed with a male thread thereon 35a at the front extremity thereof. The impeller 32 and the impeller shaft 35 are connected by the male thread 35a being rotatably and threadably engaged with a female thread formed inside the rear portion 32b of the impeller boss 32a.

Therefore, the front portion of the impeller boss 32a is connected to the drive shaft 22, and the rear portion 32b of the boss is connected to the impeller shaft 35, whereby the drive shaft 22, the impeller 32 and the impeller shaft 35 all rotate interconnectedly together.

Collar Structure

The impeller shaft 35 is provided with a cylindrical collar 40 surrounding the outer periphery thereof, and the collar 40 is integrally formed with the impeller 32 by extending the rear portion 32b of the impeller boss 32a rearwardly, for partial extension thereof inside of the bearing unit. The inner peripheral surface of the collar 40 is in intimate contact with the outer peripheral surface of the impeller shaft 35.

A water-resistant seal 37 is provided between the collar 40 and the bearing unit 33 of the stator. Therefore, there is little or no possibility that water will be able to enter into the bearing unit 33 through the gap between the bearing unit 33 and the collar 40. In the embodiment of FIG. 3, the seal 37 includes two separate annular sealing members in sequence.

The collar 40 is integrally formed with the impeller boss 32a as an extension of the rear portion 32b thereof. Therefore, there is no gap existing between the collar 40 and the rear portion 32b of the impeller boss 32a, and as a result of the described structure, water is prevented from leaking in between these components to contact the outer peripheral surface of the impeller shaft 35.

Shock-Absorbing Member-First Embodiment

A shock-absorbing member 50 may also be provided in the impeller boss 32a between the front end 35b of the impeller shaft 35 and the rear end 22c of the drive shaft 22, for cushioning the rear tip end 22c of the drive shaft. The shock-absorbing member 50 may be formed of rubber or from a suitable water-resistant elastomer. The shock-absorbing member 50 may be provided with a convex front face 59, as shown, to contact and cushion the rear tip end 22c of the drive shaft 22.

The outer periphery of the shock-absorbing member 50 is configured to allow fluid(s) such as air and/or grease to flow therepast, from the impeller shaft 35 side toward the drive shaft 22 side, when the impeller shaft 35 is assembled to the impeller boss 32a.

Figure 4A:
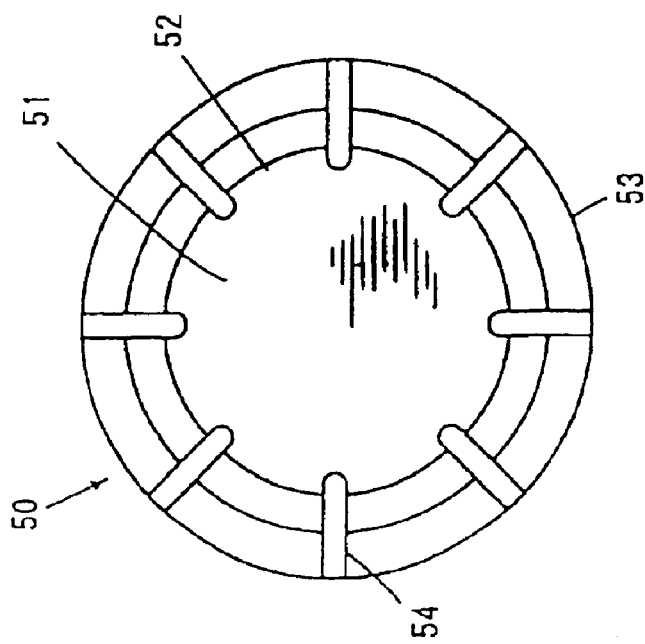
Figure 4B:
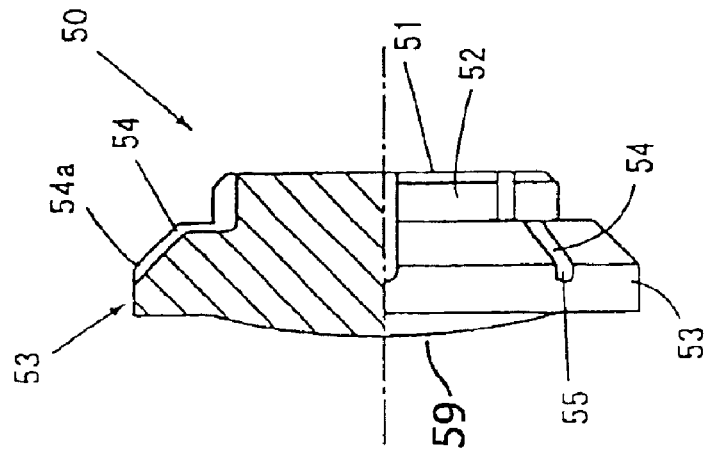

FIGS. 4(a) and 4(b) are drawings showing a shock-absorbing member 50 according to a first embodiment thereof, in which FIG. 4(a) is a rear plan view of the shock absorbing member taken from a vantage point behind the vessel body, and FIG. 4(b) is a partially cross-sectional side view thereof.

As shown in FIGS. 3 and 4(b), the shock-absorbing member 50 includes a reduced-diameter fitting portion 51 to be fitted to a screw hole 32c of the impeller boss 32a, and a large-diameter sealing portion 53 to be brought into intimate contact with the inner peripheral surface of the impeller boss 32a.

At least one fluid channel 54 is formed in the body of the shock-absorbing member 50, so as to extend from an outer peripheral surface 52 of the reduced-diameter fitting portion 51 to a middle part of the large-diameter sealing portion 53, as shown. In the embodiment of FIGS. 4(a) and (b), a plurality of fluid channels 54 extend substantially radially along the rear surface of the shock-absorbing member 50.

When the shock-absorbing member 50 of FIGS. 4(a) and (b) is used with such fluid channel 54, and when the impeller shaft 35 is screwed into the impeller boss 32a, a fluid, such as air or grease, situated between the front end 35b of the impeller shaft and the shock-absorbing member 50 may be forced through the fluid channel(s) 54. Such fluid bypasses the shock-absorbing member 50 and flows toward the drive shaft 22 side.

During the installation process, the outer edge portion of the large-diameter sealing portion 53 deforms slightly, to allow the air and/or grease to pass thereby. In this way, the shock-absorbing member 50 also functions as a pressure relief valve. Since the drive shaft 22 and the impeller 32 are engaged with each other by spline, the fluid can be forced along the spline.

After the impeller shaft 35 has engaged with the impeller boss 32a, the large-diameter sealing portion 53 of the shock-absorbing member 50 is brought into intimate contact with the inner peripheral surface of the impeller boss 32a, and thus it also functions to help block water coming into the impeller shaft 35 side from the drive shaft side 22.

Shock-Absorbing Member-Second Embodiment

Figure 5A:
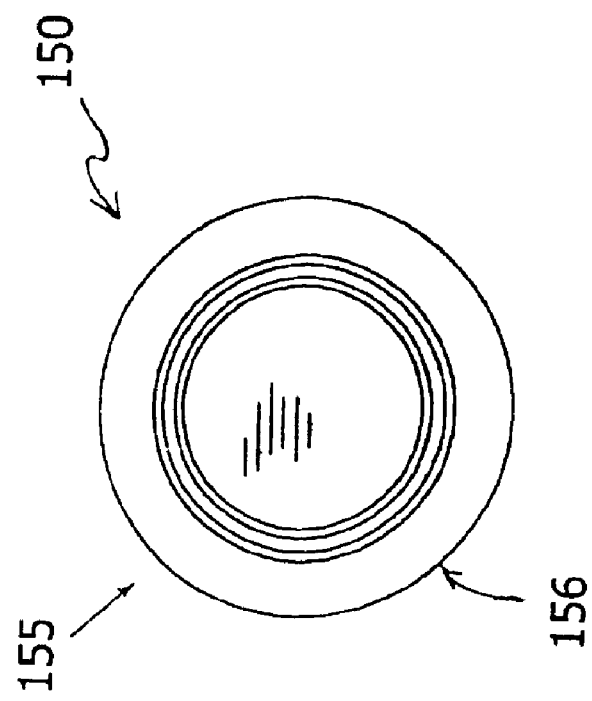
Figure 5B:
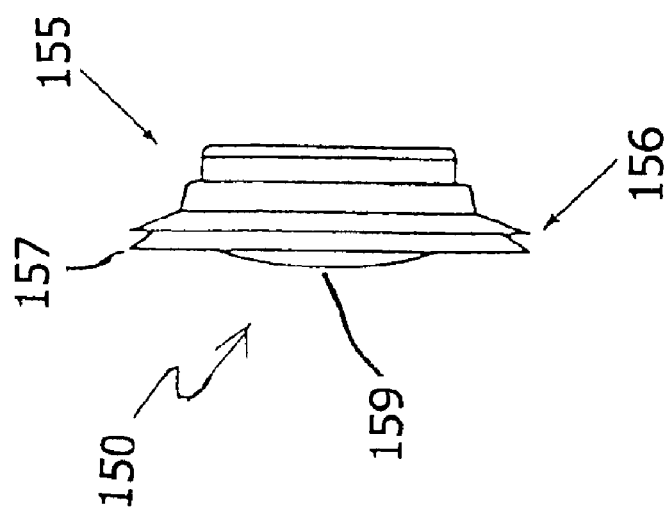
Figure 6:
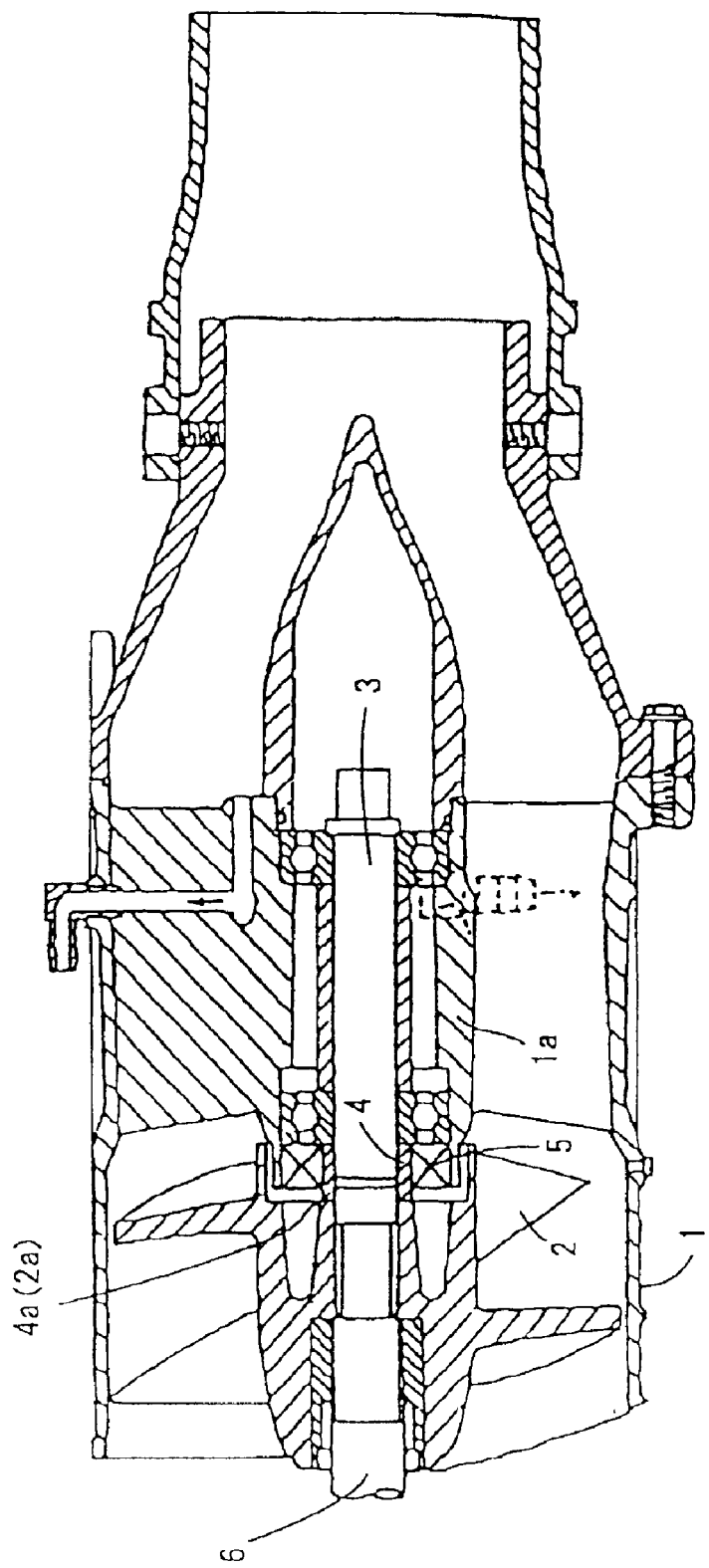
FIG. 6 is a cross-section of a previously known water jet propeller, and is reproduced from Japanese utility Model Registration No. 2548210.

FIGS. 5(a) and 5(b) are drawings showing a modified version of the shock-absorbing member according to a second embodiment thereof, in which FIG. 5(a) is a rear plan view of the shock absorbing member taken from a vantage point behind the vessel body, and FIG. 5(b) is a side view thereof.

The shock-absorbing member 150 may be provided with a convex front face 159, as shown, to contact and cushion the rear tip end 22c of the drive shaft 22.

A shock-absorbing member 155, according to the embodiment of FIG. 5, is formed in such a manner that a large-diameter sealing portion 156, that comes into intimate contact with the inner peripheral surface of the impeller boss 32a, is formed with at least one ring-shaped thin sealing lip 157 thereon, so that a fluid such as air or grease can easily be released toward the drive shaft 22.

In this arrangement, when the impeller shaft 35 is fastened to the impeller boss 32a, air (or grease) between the front end 35b of the impeller shaft and the shock-absorbing member 155 is allowed to flow toward the drive shaft 22 side, while slightly deforming the resilient sealing lip portion 157, in association with threaded installation of the impeller shaft 35.

The sealing lip portion 157 is brought into direct contact with the inner peripheral surface of the impeller boss 32a, so that after the impeller shaft 35 has been installed in the impeller boss 32a, it also has a function to substantially block water coming toward the impeller shaft 35 side from the drive shaft 22 side.

Cap Attachment and Sealing

As shown in FIG. 3, the front portion of the cap 34 is formed with an insertion portion (cylindrical portion) 34b to be inserted into the rear portion of the bearing unit 33, and with three insertion holes 34c for screws 36 (only one of them is shown in the drawing). The cylindrical insertion portion 34b is formed with a mounting groove for an O-ring 34e.

Therefore, the O-ring 34e is attached to the insertion portion 34b of the cap 34, the insertion portion 34b is inserted (press-fitted) into the rear portion of the bearing unit 33 as shown in FIG. 3, and then the cap 34 is attached to the rear portion of the bearing unit 33 with screws 36.

When the cap is thus attached, water is substantially prevented from entering into the bearing unit 33 past the O-ring 34e.

A contact surface of the cap 34, with respect to the bearing unit 33, is formed with a partial notch 34d, so that the cap 34 can easily be detached by inserting the tip of a tool (for example, a screwdriver) into the notch 34d, after removing the screws 36.

Advantages of the Described Structure

According to the water jet propeller apparatus as described above, the following advantages are achieved.

The stator 31 defines the channel 18 therein, with the impeller 32 rotatably disposed in the stator 31, and the impeller shaft 35 is integrally connected to the impeller 32 and is rotatable therewith in the stator 31. The collar 40 is provided surrounding the impeller shaft 35, and the water-resistant seal 37 is provided between the collar 40 and the stator 31. Since the collar 40 is integrally formed with the impeller 32, there is no gap able to be formed therebetween, and water is prevented from entering between these components toward the impeller shaft 35.

Therefore, the surface of the impeller shaft 35 is substantially prevented from being exposed to a corroding condition (at least prevented from being significantly exposed to a corroding condition), and consequently, it is not necessary to form the impeller shaft of a corrosion-inhibiting material, such as stainless steel. In other words, the impeller shaft 35 may be formed of ferrous materials such as iron or steel, and thus the cost of the impeller shaft may be reduced.

In addition, since the collar 40 and the impeller 32 are integrally formed with one another as a single part, the number of components can be reduced. Furthermore, since the inner peripheral surface of the collar 40 is in intimate contact with the outer peripheral surface of the impeller shaft 35, connecting rigidity between the impeller shaft 35 and the impeller 32 may be improved.

(b) Since the impeller shaft 35 is connected to the back of the impeller 32 by a threadable and rotatable connection, and the drive shaft is connected to the front of the impeller 32 by spline fit, the impeller shaft 35 and the impeller 32 can be concurrently removed from the drive shaft in a joined state.

In this embodiment, by removing a bolt securing the jet pump 30 to the vessel body 11, the jet pump 30 can be removed toward the rear.

Since the shock-absorbing member 50 for the rear end 22c of the drive shaft is provided between the front end 35b of the impeller shaft 35 and the rear end 22c of the drive shaft 22 in the impeller 32, the impact exerted when the impeller 32 is attached to the rear end 22c of the drive shaft may be alleviated.

In this arrangement, assuming that no measure is taken, there arises a problem in that air (or grease) between the impeller shaft 35 and the shock-absorbing member 50 is trapped when threaded means the impeller shaft 35 to the back of the impeller 32, and thus the shock-absorbing member 50 may excessively be deformed.

In order to cope with such problem, in the water jet propeller apparatus according to this embodiment, the outer periphery of the shock-absorbing member 50 is formed so as to allow a fluid to flow therepast, from the impeller shaft 35 side to the drive shaft 22 side, when the impeller shaft is assembled to the impeller. Therefore, excessive deformation of the shock-absorbing member 50 is prevented.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having thus, described the invention, what is claimed is:

1. A water jet propeller apparatus, comprising:
   a stator defining a channel therein;
   an impeller rotatably disposed in the stator;
   an impeller shaft rotatably supported in the stator and connected to the impeller; and
   wherein said impeller comprises a collar for placement surrounding the outer periphery of the impeller shaft, said collar being integrally formed with the impeller; and wherein said apparatus further comprises a water-resistant seal surrounding the collar.

2. The water jet propeller apparatus of claim 1, further comprising a bearing unit operatively connected to the stator and housed therein, and wherein said collar extends inside a portion of said bearing unit.

3. The water jet propeller apparatus of claim 1, wherein said water-resistant seal comprises two sequential annular sealing members.

4. A water jet propeller apparatus according to claim 1, wherein the impeller shaft is threadably connected to a rear portion of the impeller.

5. A water jet propeller apparatus according to claim 1, wherein a drive shaft is connectable to a front portion of the impeller by a spline fit.

6. A water jet propeller apparatus according to claim 1, wherein the water-jet propeller further comprises a shock-absorbing member provided in the impeller proximate a front end of the impeller shaft to cushion a rear tip end of the drive shaft, the shock-absorbing member having an outer periphery with at least one fluid passage formed therein
   said shock-absorbing member being constructed and arranged to allow a fluid to flow therepast, from the impeller shaft side toward the drive shaft side, when the impeller shaft is installed on the impeller.

7. A water jet propeller apparatus according to claim 6, wherein the shock absorbing member comprises a reduced-diameter reduced-diameter fitting portion and a large-diameter sealing portion, and wherein said at least one fluid passage comprises a plurality of grooves formed substantially radially from said reduced-diameter fitting portion to an edge of said sealing portion.

8. A water jet propeller apparatus according to claim 1, wherein the impeller shaft is threadably connected to a rear portion of the impeller,
   wherein a drive shaft is connectable to a front portion of the impeller by a spline fit,
   and wherein the water-jet propeller further comprises a shock-absorbing member provided in the impeller proximate a front end of the impeller shaft to cushion a rear tip end of the drive shalt, the shock-absorbing member having an outer periphery with at least one passage formed therein;
   said shock-absorbing member being constructed and arranged to allow a fluid to flow therepast, from the impeller shaft side toward the drive shaft side, when the impeller shaft is threadably installed on the impeller.

9. A water jet propeller apparatus, comprising:
   a stator defining a channel therein;
   an impeller rotatably disposed in the stator;
   an impeller shaft rotatably supported in the stator and connected to the impeller;
   a collar provided on the outer periphery of the impeller shaft;
   a water-resistant seal surrounding the collar; and
   a shock-absorbing member provided in the impeller proximate a front end of the impeller shaft to cushion a rear tip end of the drive shaft, the shock-absorbing member having an outer periphery with at least one fluid passage formed therein said shock-absorbing member being constructed and arranged to allow a fluid to flow therepast, from the impeller shaft side toward the drive shaft side, when the impeller shaft is installed on the impeller.

10. The water jet propeller apparatus of claim 9, wherein the shock absorbing member comprises a reduced-diameter reduced-diameter fitting portion and a large-diameter sealing portion, and wherein said at least one fluid passage comprises a plurality of grooves formed substantially radially from said reduced-diameter fitting portion to an edge of said sealing portion.

11. The water jet propeller apparatus of claim 9, wherein the shock absorbing member has a convex front face for cushioning contact with a rear tip portion of said drive shaft.

12. The water jet propeller apparatus of claim 9, wherein the shock absorbing member comprises at least one resiliently deformable lip at an outer periphery thereof.

13. The water jet propeller apparatus of claim 9, further comprising a bearing unit operatively connected to the stator and housed therein, and wherein said collar extends inside a portion of said bearing unit.

14. The water jet propeller apparatus of claim 9, wherein said water-resistant seal comprises two sequential annular sealing members.

15. A water jet propeller apparatus according to claim 9, wherein the impeller shaft is threadably connected to a rear portion of the impeller.

16. A water jet propeller apparatus according to claim 9, wherein a drive shaft is connectable to a front portion of the impeller by a spline fit.

17. A water jet propeller apparatus, comprising:

a stator defining a channel therein;

an impeller rotatably disposed in the stator;

an impeller shaft rotatably supported in the stator and connected to the impeller;

a collar provided on the outer periphery of the impeller shaft; and a water-resistant seal surrounding the collar;

wherein the impeller shaft is threadably connected to a rear portion of the impeller.

18. A water jet propeller apparatus according to claim 9, wherein a drive shaft is connectable to a front portion of the impeller by a spline fit.

19. The water jet propeller apparatus of claim 1, further comprising a bearing unit operatively connected to the stator and housed therein, and wherein said collar extends inside a portion of said bearing unit.

20. A water jet propeller apparatus according to claim 1, wherein the water-jet propeller further comprises a shock-absorbing member provided in the impeller proximate a front end of the impeller shaft to cushion a rear tip end of the drive shaft, the shock-absorbing member having an outer periphery with at least one fluid passage formed therein.

21. A water jet propeller apparatus, comprising:

a stator defining a channel therein an impeller rotatably disposed in the stator, an impeller shaft rotatably supported in the stator and connected to the impeller;

a drive shaft rotatably disposed in the stator coaxially with the impeller shaft;

a collar provided on the outer periphery of the impeller shaft; and a water-resistant seal surrounding the collar;

wherein the impeller shaft is threadably connected to a rear portion of the impeller, and the drive shaft is operatively connected to a front portion of the impeller.

* * * * *